(12) United States Patent
Lyon (10) Patent No.: US 6,493,812 B1
(45) Date of Patent: Dec. 10, 2002

(54) APPARATUS AND METHOD FOR VIRTUAL ADDRESS ALIASING AND MULTIPLE PAGE SIZE SUPPORT IN A COMPUTER SYSTEM HAVING A PREVALIDATED CACHE

(75) Inventor: Terry L Lyon, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/465,722

(22) Filed: Dec. 17, 1999

(51) Int. Cl.[7] .............................................. G06F 12/10
(52) U.S. Cl. ....................... 711/207; 711/108; 711/210; 711/128
(58) Field of Search ................................ 711/108, 201, 711/206, 207, 144–145, 210, 128, 171; 712/204, 216–217; 365/49

(56) References Cited

U.S. PATENT DOCUMENTS

| | | | | |
|---|---|---|---|---|
| 5,133,058 A | * | 7/1992 | Jensen ......................... | 711/207 |
| 5,457,788 A | | 10/1995 | Machida ...................... | 711/108 |
| 5,465,337 A | * | 11/1995 | Kong .......................... | 711/207 |
| 5,475,825 A | * | 12/1995 | Yonezawa et al. ............. | 711/1 |
| 5,526,504 A | * | 6/1996 | Hsu et al. .................... | 711/207 |
| 5,859,999 A | | 1/1999 | Morris et al. ................ | 712/224 |
| 5,860,017 A | | 1/1999 | Sharangpani et al. ......... | 712/23 |
| 6,014,732 A | * | 1/2000 | Naffziger .................... | 711/203 |

FOREIGN PATENT DOCUMENTS

| | | | | |
|---|---|---|---|---|
| EP | 0725348 A1 | 1/1996 | ........... | G06F/12/10 |
| EP | 0911737 A1 | 5/1998 | ........... | G06F/12/10 |

OTHER PUBLICATIONS

Wolfe, A., "Patents shed light on Merced's Innards", Electronic Engineering Times, Feb. 15, 1999, 2 pages.

* cited by examiner

Primary Examiner—Matthew Kim
Assistant Examiner—Denise Tran (57) ABSTRACT

A computer micro-architecture employing a prevalidated cache tag design includes circuitry to support virtual address aliasing and multiple page sizes. Support for various levels of address aliasing are provided through a physical address CAM, page size mask compares and a column copy tag function. Also supported are address aliasing that invalidates aliased lines, address aliasing with TLB entries with the same page sizes, and address aliasing the TLB entries of different sizes. Multiple page sizes are supported with extensions to the prevalidated cache tag design by adding page size mask RAMs and virtual and physical address RAMs.

17 Claims, 11 Drawing Sheets

APPARATUS AND METHOD FOR VIRTUAL ADDRESS ALIASING AND MULTIPLE PAGE SIZE SUPPORT IN A COMPUTER SYSTEM HAVING A PREVALIDATED CACHE

TECHNICAL FIELD

The technical field encompasses computer architectures having prevalidated cache designs. In particular, the technical field encompasses an architecture to support virtual address aliasing and multiple page sizes.

BACKGROUND

Computer systems may employ a multi-level hierarchy of memory, with relatively fast, expensive, but limited-capacity memory at the highest level of the hierarchy proceeding to relatively slower, lower cost, but higher-capacity memory at the lowest level of the hierarchy. Typically, the hierarchy includes a small fast memory called a cache, either physically integrated within a processor or mounted physically close to the processor for speed. The computer system may employ separate instruction caches and data caches. In addition, the computer system may use multiple levels of caches. The use of a cache is transparent to a computer program at the instruction level and can thus be added to a computer architecture without changing the instruction set or requiring modification to existing programs.

A cache hit occurs when a processor requests an item from a cache and the item is present in the cache. A cache miss occurs when a processor requests an item from a cache and the item is not present in the cache. In the event of a cache miss, the processor retrieves the requested item from a lower level of the memory hierarchy. In many processor designs, the time required to access an item for a cache hit is one of the primary limiters for the clock rate of the processor, if the designer is seeking a single cycle cache access time. In other designs, the cache access time may be multiple cycles, but the performance of a processor can be improved in most cases when the cache access time in cycles is reduced. Therefore, optimization of access time for cache hits is critical to the performance of the computer system.

Associated with cache design is a concept of virtual storage. Virtual storage systems permit a computer programmer to think of memory as one uniform single-level storage unit but actually provide a dynamic address-translation unit that automatically moves program blocks on pages between auxiliary storage and the high speed storage (cache) on demand.

Also associated with cache design is a concept of fully associative or content-addressable memory (CAM). Content-addressable memory is a random access memory that, in addition to having a conventional wired-in addressing mechanism, also has wired-in logic that makes possible a simultaneous comparison of desired bit locations of a specified match for all entries during one memory-cycle time. Thus, the specific address of a desired entry need not be known since a portion of its contents can be used to access the entry. All entries that match the specified bit locations are flagged and can be addressed on the current or subsequent memory cycles.

Memory may be organized into words (for example, 32 bits or 64 bits per word). The minimum amount of memory that can be transferred between a cache and the next lower level of memory hierarchy is called a line or a block. A line may be multiple words (for example, 16 words per line). Memory may also be divided into pages, or segments, with many lines per page. In some computer systems page size may be variable.

In modern computer memory architectures, a central processing unit (CPU) produces virtual addresses that are translated by a combination of hardware and software to physical addresses. The physical addresses are used to access a physical main memory. A group of virtual addresses may be dynamically assigned to each page. A special case of this dynamic assignment is when two or more virtual addresses are assigned to the same physical page. This is called virtual address aliasing. Virtual memory requires a data structure, sometimes called a page table, that translates the virtual address to the physical address. To reduce address translation time, computers may use a specialized associative cache dedicated to address location, commonly called a translation lookaside buffer (TLB).

If a cache stores an entire line address along with the data and any line can be placed anywhere in the cache, the cache is said to be fully associative. For a large cache in which any line can be placed anywhere, the hardware required to rapidly determine if and where an item is in the cache may be very large and expensive. For larger caches a faster, space saving alternative is to use a subset of the address (called an index) to designate a line position within the cache, and then store the remaining set of the more significant bits of each physical address, called a tag, along with the data. In a cache with indexing, an item with a particular address can be placed only within a set of lines designated by the index. If the cache is arranged so that the index for a given address maps exactly to one line in the subset, the cache is said to be direct mapped. If the index maps to more than one line in the subset, or way, the cache is said to be set-associative. All or part of an address may be hashed to provide a set index that partitions the address space into sets.

With direct mapping, when a line is requested, only one line in the cache has matching index bits. Therefore, the data can be retrieved immediately and driven onto a data bus before the computer system determines whether the rest of the address matches. The data may or may not be valid, but in the usual case where the data is valid, the data bits are available on the data bus before the computer system determines validity. With set associative caches, the computer system cannot know which line corresponds to an address until the full address is compared. That is, in set-associative caches, the result of a tag comparison is used to select which line of data bits within a set of lines is presented to the processor.

In a cache with a TLB, the critical timing path for a hit requires a sequence of four operations: 1) a virtual tag must be presented to the TLB to determine the location of a corresponding physical tag in random access memory (RAM) in the TLB; 2) the physical tag must then be retrieved from the TLB random access memory; 3) the physical tag from the TLB RAM must then be compared to physical tag's accessed from the tag section of the cache; and 4) the appropriate data line must be selected. The sequence of four operations is required to read the cache and can be a limiter to processor frequency and processor performance.

SUMMARY

A computer architecture with a prevalidated tag cache design includes a prevalidated tag that holds TLB bits corresponding to TLB entry slot numbers, instead of physical or virtual addresses. To support virtual address aliasing, additional logic circuits are added to the cache micro-architecture. The logic allows the prevalidated tag cache design to allow different users with different virtual addresses to access a same physical address space. The logic circuitry may include a physical address, content addressable memory (CAM) and a page size mask. The logic circuit compares physical addresses and page sizes among existing TLB entries a new TLB entry. If a match is found, the logic circuit can direct invalidation of an existing TLB entry, replacement of the TLB entry, or saving of the current TLB entry in a new TLB slot location.

To support multiple page sizes, additional logic circuits are added to the cache micro-architecture. This logic allows the prevalidated tag cache design to support multiple page sizes. The logic may include a subset of the physical address in the prevalidated tag, a page size mask and a content addressable memory (CAM) in the prevalidated tag. A page size mask and optionally a CAM that uses the page size mask for virtual address hits, may be added to the TLB. Logic may be added to the cache hit logic to add in page variable results.

DESCRIPTION OF THE DRAWINGS

The apparatus and method will be described with reference to the following drawings, wherein like numerals refer to like elements and wherein.

DESCRIPTION

A cache having a TLB in which physical tags do not need to be retrieved from the TLB may improve the overall time for the critical path for accessing caches with TLBs. In such a design, instead of storing physical tags in a cache, the cache stores a location within the TLB where the physical tag is stored. The TLB may include two or more CAMs. For a cache hit, one of the CAMs in the TLB may generate a vector, or TLB hit, that specifies a location within the TLB where the physical address is stored. The vector may be compared to a location vector, or hit bit, stored in the cache. The comparison of location vectors provides sufficient information to enable selection of one data line within a set without having to actually retrieve the physical address. As a result, a substantial time consuming operation (physical address retrieval) is removed from the critical time path of a cache hit. In addition, comparing location vectors rather than physical tags enables use of comparison logic that is faster and simpler than convention digital comparators.

Figure 1:
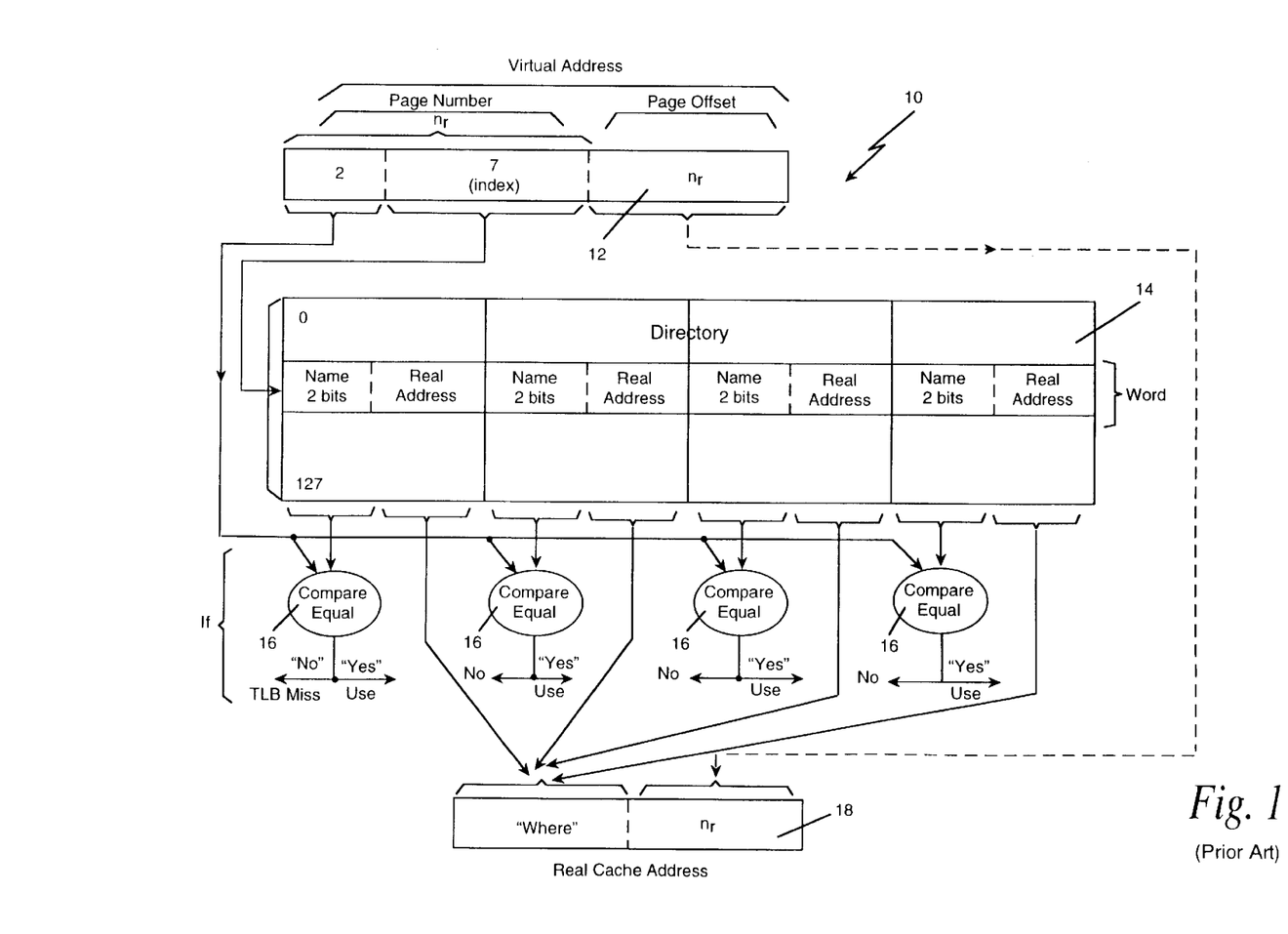
FIGS. 1 and 2 illustrate prior art computer micro-architectures.

FIG. 1 illustrates an example of a prior art cache. The system 10 includes a virtual address 12, a random access memory array 14, a comparator 16 and a physical cache-address register 18. The system 10 employs set-associative logic. The random access array 14 includes a total of 128 (four) entries requiring two virtual page address index bits. Each set of four is part of one physical word (horizontal) of the random access array, so that there are 128 such words, requiring seven address bits. The virtual page number must be used in the address translation to determine if and where the cache page resides. Lower order bits N, which represent the byte within the page, need not be translated. Seven virtual bits are used to select directly one of the 128 words. Words read out of the set are compared simultaneously with the virtual addresses, using the comparator 16. If one of the comparisons gives a "yes," then the correct real or physical address of the page in the cache, which resides in the random access memory array 14, is gated to the physical cache-address register 18. The physical address is used on a subsequent cycle to obtain the correct information from a cache array (not shown).

Figure 2:
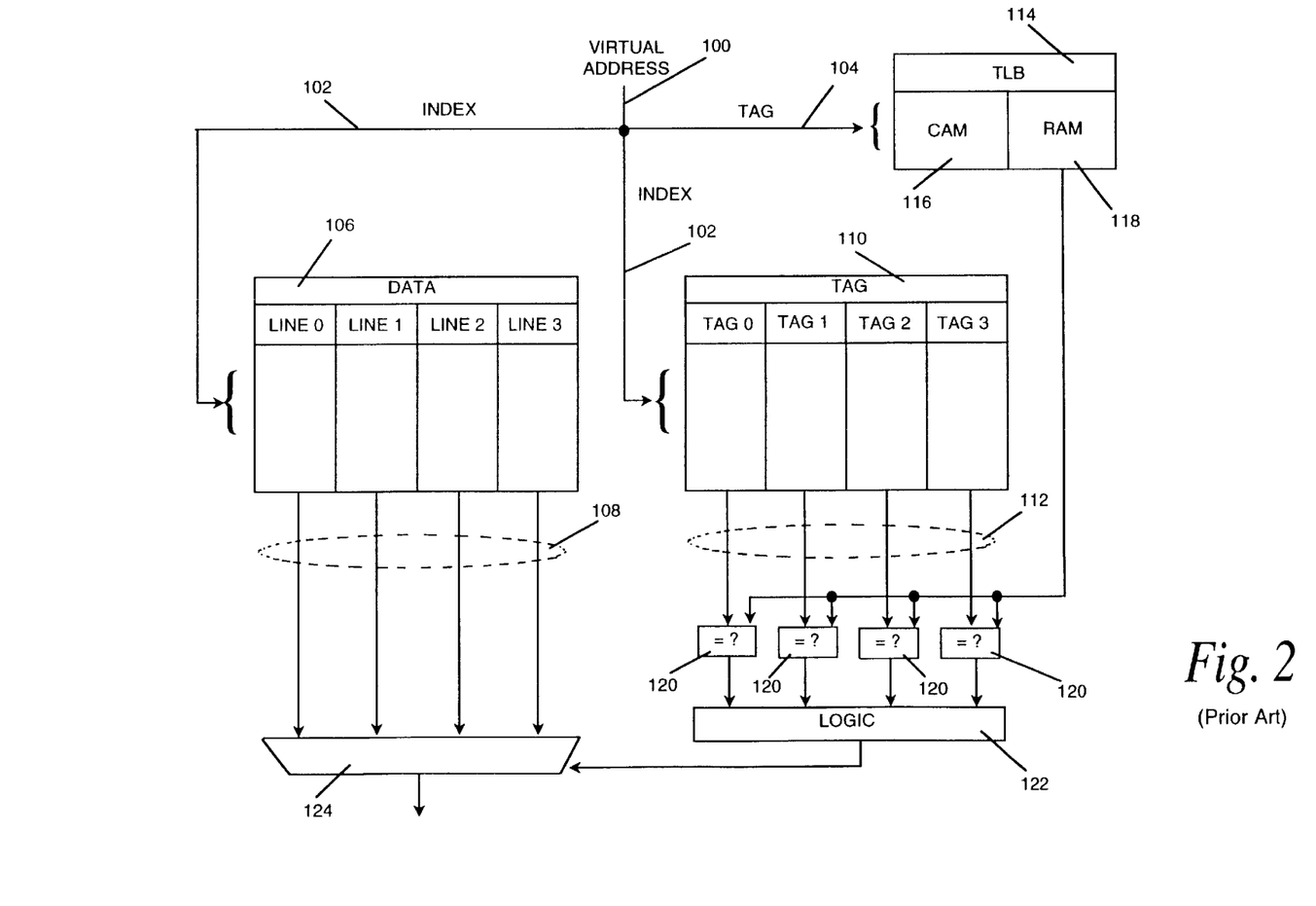

FIG. 2 illustrates another prior art cache. Four-way set-associative caches are used for illustration. A virtual address 100 comprises lower order index bits 102 and upper order virtual tag bits 104. The index bits 102 are typically the same for the virtual address and the physical address. The index bits 102 are used to select one set of lines of data in a data section 106 of the cache. The output of the data section 106 is four lines of data 108. The index bits 102 are also used to select a set of physical tags in a tag section 110 of the cache. The output of the tag section 110 is four physical tags 112, each corresponding to one data line 108. The virtual tag bits 104 are used to select one entry in a CAM 116 within a TLB 114. The TLB 114 stores both virtual and physical tags. If the virtual tag bits 104 do not find a match in the CAM 116, a TLB miss occurs. In the system shown in FIG. 2, multiple virtual tags may map to one physical tag. For a TLB hit, the selected CAM 116 entry designates an address in a TLB RAM 118 for a physical tag corresponding to a virtual tag 104. A physical tag is then retrieved from the TLB RAM 118. Each of four digital comparators 120 then compares the physical tag from the TLB RAM 118 to a physical tag 112 from the tag section 110. A matching pair of physical tags indicates through logic 122 which of four lines of data is selected by a multiplexer 124. For a particular index bit, there may not be a matching pair of physical tags, in which case a cache miss occurs.

Figure 3:
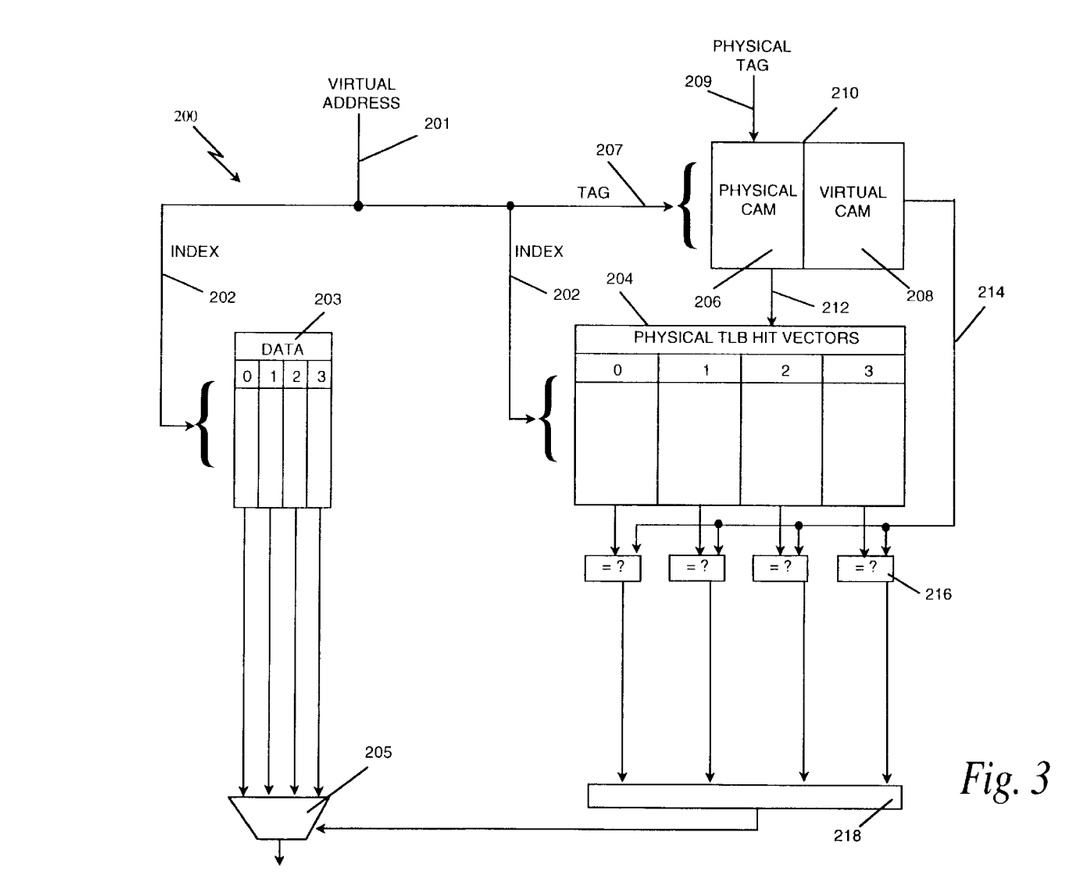
FIG. 3 illustrates a prevalidated cache tag micro-architecture.

FIG. 3 illustrates a computer micro-architecture having a four-way set-associative cache 200. The cache 200 includes index bits 202, a data section 203 and multiplexer 205. A cache tag section 204 includes physical TLB hit tags corresponding to data lines. When a new line of data is placed in the cache 200, instead of the physical address tag being stored in the cache tag section 204, a vector 212 (called a physical TLB hit vector) is stored in the tag section 204.

In the cache 200, a TLB 210 has two CAMs, a physical CAM 206 containing physical tags and a virtual CAM 208 containing virtual tags. When a new virtual tag 207 is stored in the virtual CAM 208, a corresponding physical tag 209 is also available via a computer operating system and the corresponding physical tag 209 is stored in the physical CAM 206. A physical TLB hit vector 212 has a binary "1" corresponding to each location in the physical CAM 206 that has the physical tag 209. Upon entry of a new line into the cache 200, the physical TLB hit vector 212, indicating the location of all the instances in the physical CAM 206 of the physical tag 209 of the new line, is generated by the physical CAM 206 and stored into the cache tag section 204, at a row location determined by the index bits 202 and at a column location determined by a set placement algorithm.

For a cache access, a virtual tag 207 is used by the virtual CAM 208 to generate a virtual TLB hit vector 214. If there is a TLB miss, the virtual TLB hit vector 214 is all binary "0s." If there is a TLB hit, the virtual TLB hit vector 214 has a single binary "1," indicating the location of the virtual tag 207 in the virtual CAM 208. Each virtual tag 207 in the TLB 210 must be unique.

For cache access, the index bits 202 select a set of four physical TLB hit vectors 212 in the cache tag section 204. Each of the four physical TLB hit vectors 212 in cache tag section 204 is compared using one of the four comparators 216, to the virtual TLB hit vector 214 from the virtual CAM 208. For any given set of index bits 202, only one of the four selected physical tags in cache tag section 204 matches the virtual TLB hit vector 214 from the TLB 210 for a fixed page size. For a fixed page size, a single pair of matching "1s" in the four physical TLB hit vectors 212 then determines which data line is selected by the multiplexer 205. For a given set of index bits 202, if there are no matching "1s" in the compared four physical TLB vectors 212, a cache miss occurs.

In the cache 200, the physical address tag from the TLB 210 is not retrieved for cache access. Eliminating the operation of retrieving the physical address tag from the TLB 210 substantially reduces the amount of time in the critical time path for the cache access. Because the cache 200 looks for a pair of matching logical "1s" to determine a match, the comparators 216 may be simple AND gates followed by a large fan-in OR gate.

Additional details related to prevalidated cache architectures are provided in U.S. patent application Ser. No. 08/955,821 filed on Oct. 22, 1997, now U.S. Pat. No. 6,014,732 entitled CACHE MEMORY WITH REDUCED ACCESS TIME, the disclosure of which is hereby incorporated by reference.

Figure 4:
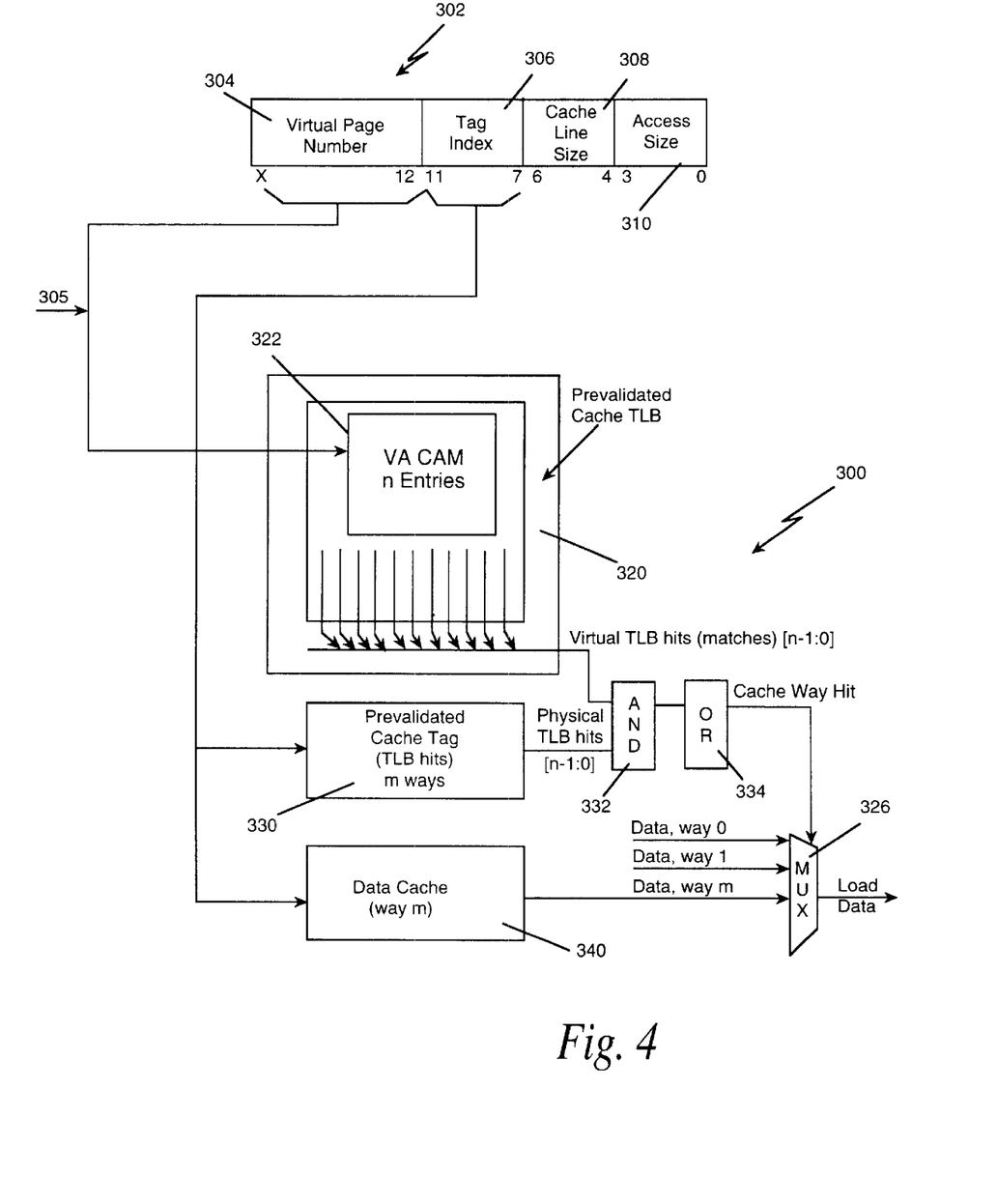
FIG. 4 illustrates a single page size prevalidated tag cache micro-architecture.

FIG. 4 shows a prevalidated cache tag micro-architecture 300 that supports a single page size. FIG. 4 is a different representation of the prevalidated cache tag design shown in FIG. 3, and is shown here to clarify the extensions to the micro-architecture given in FIGS. 5–9. The micro-architecture 300 includes a prevalidated cache TLB 320 having a virtual address CAM 322. The virtual address CAM 322 is shown containing n entries. Also included in the micro-architecture 300 is a prevalidated cache tag 330 containing physical TLB hit vectors, and a data cache 340. The data cache 340 includes m ways. Virtual address 302 includes access size information 310 (bits 0 to 3), cache line size information 308 (bits 4 through 6) tag index 306 (bits 7 through 11), and a virtual page number 304 (bits 12 through X). The upper information portion of the virtual address 302, that is the tag index 306 and the virtual page number 304, are provided to the prevalidated cache TLB 320, the prevalidated cache tags 330 and the data cache 340.

In normal operation, the prevalidated cache TLB 320 is accessed to find a match with the virtual page number 304 of the memory operation. The virtual address CAM 322 outputs a vector of virtual TLB hit bits indicating one or more TLB entries that match the virtual page number 304. At the same time, the prevalidated cache tag 330 is accessed with some index bits of the virtual address 302, and a vector of physical TLB hit bits is read from the prevalidated cache tag 330. The virtual TLB hit bits from the virtual address CAM 322 are ANDed together in logic circuit 332 (an AND gate) with the physical TLB hits from the prevalidated cache tag 330 to determine if there is a match. The n bits are ORed together in the logic circuit 334 (an OR gate) to generate a single cache way hit signal. Data from the data cache 340 is then multiplexed as indicated by the cache way hits in the multiplexer 326 and the result is output as load data.

With additional logic, the prevalidated tag cache micro-architecture shown in FIG. 4 can support multiple page sizes in the virtual address translation mechanism. Large page sizes may be used to map virtual addresses into large physical address ranges without requiring an extensive number of TLB entries. For example, a 4 megabyte cache would require 1,000 TLB entries to map its entire data if 4 kilobyte pages were used. With larger pages, such as a 1 megabyte page, this mapping would require only 4 TLB entries.

Figure 5:
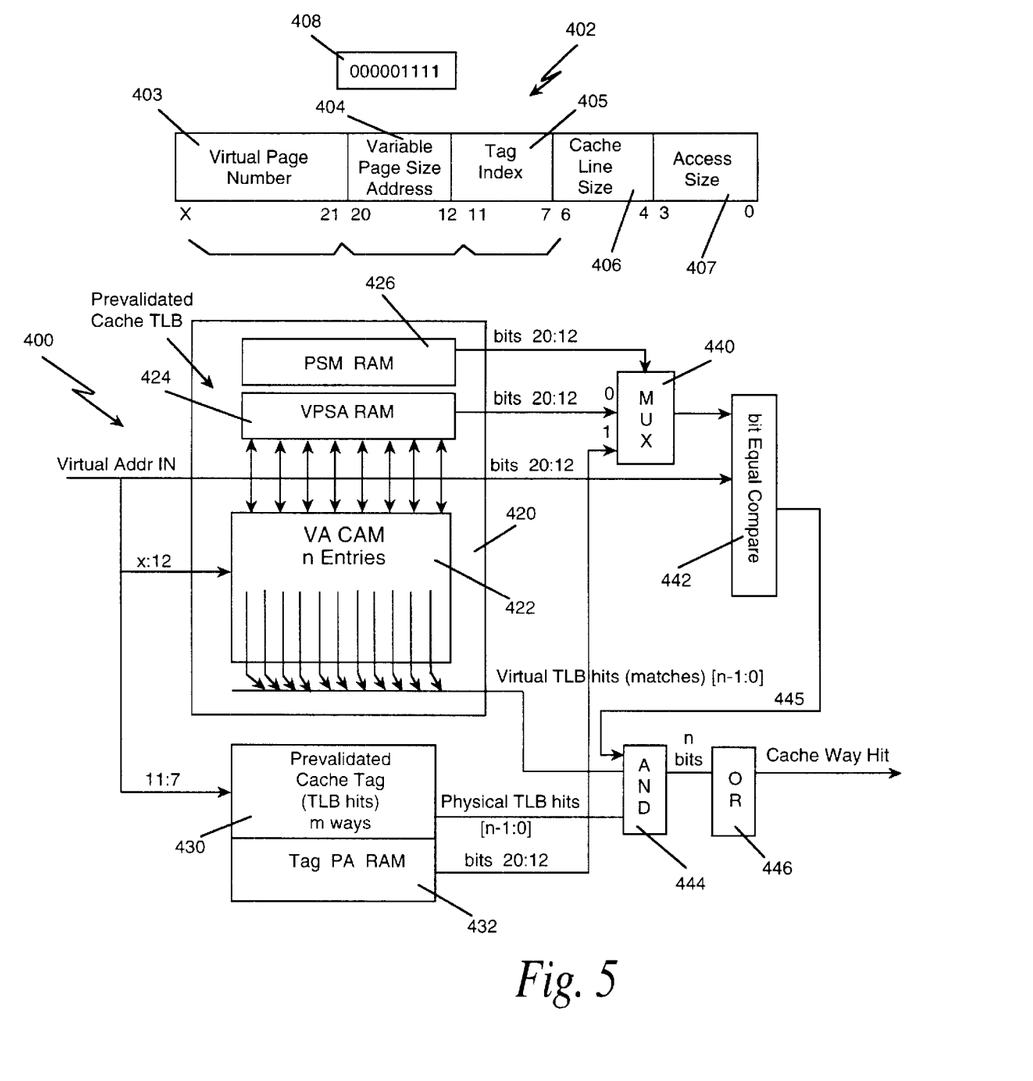
FIG. 5 illustrates a multiple page size prevalidated tag cache micro-architecture.

FIG. 5 shows extensions to the prevalidated cache tag design of FIG. 4 to support multiple page sizes. In FIG. 5, the micro-architecture 400 includes a prevalidated cache TLB 420 and a prevalidated cache tag 430. Also included are a multiplexer 440, a bit comparator 442, an AND circuit 444, and an OR circuit 446.

The virtual address 402 includes access size 407, cache line size 406, tag index 405, page variable size address 404 and virtual page number 403. Also included is a page size mask 408.

To provide the additional functionality needed to support y extra pages sizes, the prevalidated cache TLB 420 includes, in addition to a virtual address (VA) CAM 422, a page size mask (PSM) RAM 426 and a variable page size address (VPSA) RAM 424. The PSM RAM 426 is an extension to the TLB 420 structure. The PSM RAM 426 is a random access memory block that holds a page size mask, such as the page size mask 408, that is wide enough to support the page size capability of the cache design (y bits in this example). The page size mask bits can be reduced to less than y bits if not all power-of-2 page sizes are being supported. The PSM RAM 426 is read based on the VA CAM 422 hit bits. A single output is needed if multiple virtual to physical address mappings are not maintained in the TLB 420 at one time. Otherwise, multiple outputs (n as shown in this example) are required.

The VPSA RAM 424 is also an extension to the TLB 420 structure. The VPSA RAM 424 is a random access memory block that holds the virtual address for the page size region (y bits) for the TLB entry. These bits already reside in a full implementation of a prevalidated cache TLB 420, but now have a function beyond that for a normal content addressable memory. For TLBs 420 with only one virtual address associated with each physical address, the VPSA RAM 424 can be a simple RAM structure selected by the VA CAM 422 hit bits. If the TLB 420 for the cache design supports more than one TLB 420 entry aliased to the same physical address, then multiple VPSA RAM 424 outputs may be provided (as shown, n outputs are generated).

The prevalidated cache tag 430 functions in the same manner as the corresponding cache 330 shown in FIG. 4. However, the prevalidated cache tag 430 also includes a tag physical address RAM 432. The tag PA RAM 432 is an extension to the prevalidated cache tag 430. The tag PA RAM 432 is a random access memory block that holds physical address bits to cover the range of page sizes supported by the cache design (y bits). The tag PA RAM 432 is read out in parallel with the prevalidated cache tag physical TLB hit bits.

To reference a data cache 400 that supports multiple page sizes, the VA address bits are compared in the VA CAM 422 with the incoming virtual address IN, and virtual TLB hit bits are generated. The VA CAM 422 does not include potential VA bits that are in the page size region. The virtual TLB hit bits cause RAM cells in the TLB 420 to read out the PSM RAM 426 and the VPSA RAM 424 for each entry that hits in the VA CAM 422. Each PSM RAM bit will make a selection for its associated address bit location between the address from the VPSA RAM 424 in the TLB 420 and the physical address read out from the prevalidated cache tag, i.e., tag PA RAM 432. The multiplexer 440 is used to select whether the address information presented with a cache read access is a virtual address or a physical address. The multiplexer 440 receives inputs from the tag PA RAM 432, the VPSA RAM 424 and the PSM RAM 426. Virtual addresses would come from the prevalidated cache TLB 420 (i.e., from the VPSA RAM 424) and physical addresses from the tag PA RAM 432. The selected virtual address or physical address bits are grouped to form a VA/PA field of y bits, which are compared as a group against the corresponding bit positions of the virtual address 402 using the bit comparator 442. If both fields compare equally, a "1" is sent to a hit generation AND/OR circuit (AND circuit 444 and OR circuit 446). Depending on the virtual implementation choices for aliasing, 1 or n compare results could be generated. The virtual TLB hit signals from the VA CAM 422, the bit comparator 442, and the physical TLB hit bits from the prevalidated cache tag 430 are ANDed together in AND circuit 444 and ORed together in OR circuit 446 to generate a final cache way hit.

If a prevalidated cache tag system is designed that either invalidates its cache data on the detection of virtual address aliasing (the example shown in FIG. 6) or supports multiple TLB entries that are aliased only if they have the same page size (the example shown in FIG. 7), then a further simplification may be used. To reduce wiring interconnect and circuit latency, the PSM RAM 426 may be duplicated in the prevalidated cache tag 430 as an extension to the tag PA RAM 432. This allows a localized masking of the tag PA which is more efficient with a content addressable memory implementation. The variable page size address 404 is compared to the tag PA masked with a PSM to generate the partial hit signal 445 (as shown in FIG. 5). In this case, in addition to the duplicate PSM array contained in the prevalidated cache tag 430, the VA CAM 422 incorporates the VPSA RAM 424 and the PSM RAM 426 into a local CAM function that generates the virtual TLB hits from all of the VA compares needed, including VA bits that may be contained in the page size field. In this embodiment the MUX 440 and the compare 442 are not needed.

In some operating system environments, different virtual addresses are sometimes assigned to the same physical address space. For example, an editor used by user C may have a virtual address of C and a physical address of A, while another user may reference the same editor with a virtual address of B, which translates to the same program at physical address A. Since these users may "time-slice" execution in the same processor, both users would use the same program (e.g., the editor), but "point" to it through different virtual addresses. In cases like these, the cache data may be retained for both users and access to the cache data may be made through different virtual addresses as the users change. Address aliasing in the prevalidated tag cache system shown in FIG. 4 may be accomplished through the use of special logic, for example.

To accommodate address aliasing support for a prevalidated tag cache design, several options are available. The options vary depending on the level of capability in which the cache data can be saved when transitioning between one virtually addressed space use of a specific physical cache page to another virtually addressed use of the same page. The options include, for example: 1) not saving the cache data when a new TLB entry will access part or all of the current TLB entry's physical address space; 2) saving the cache data only when the page sizes are the same between the new and current TLB entries; and 3) saving the cache data when the page size of the new TLB entry is the same or smaller than the current TLB entry.

Figure 6:
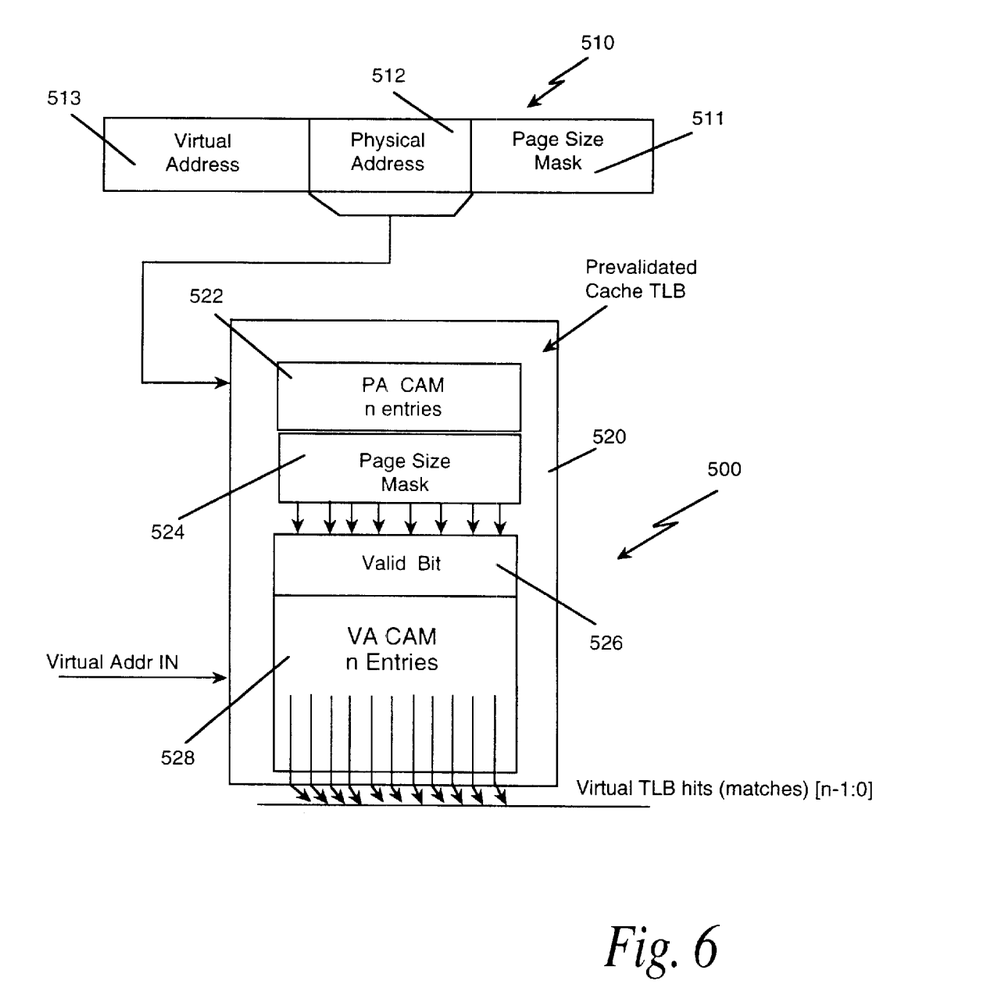
FIG. 6 illustrates a prevalidated cache TLB with address aliasing and no saving of cache data.

FIG. 6 shows a micro-architecture 500 for implementing address aliasing with no saving of cache data. In this micro-architecture, a first user may access a program or data using a first virtual address, resulting in a specific cache line. If a second user were then to access the same program or data, the second user would not find the program or data in the cache because the second user uses a second (different) virtual address. A second cache line would then be saved in the cache with the result that the cache would have two identical cache lines. This is not a desirable situation for cache design since it reduces cache efficiency (lower capacity) and requires multiple cache lines to be written on stores. To prevent this situation, logic may be added to invalidate one of the cache lines.

In FIG. 6, a new TLB entry 510 for insertion is shown with a page size mask 511, a physical address 512 and a virtual address 513. The new TLB entry 510 is provided to a prevalidated cache TLB 520 that includes a PA CAM 522, a page size mask 524, and a VA CAM 528 with a valid bit module 526. The PA CAM 522 provides for saving physical addresses in the TLB structure and the page size information for each TLB entry. The physical address 512 of each new TLB entry to be inserted into the TLB 520 is compared with the physical addresses of all existing TLB entries masked appropriately with page size information using page size mask 524 and the incoming TLB page size mask 511. Upon detection of a TLB entry that overlaps a physical address space of the new TLB entry, the existing TLB entry is invalidated and a valid bit is provided using the valid bit module 526 with each TLB entry to allow quick invalidation. In the micro-architecture 500 shown in FIG. 6, the VA CAM 528 ANDs the valid bits to the compare results to generate the virtual TLB hit outputs.

In the example shown in FIG. 6, every cache line is associated with only one TLB entry. When that TLB entry is invalidated, the cache line is effectively invalidated and not accessible. Actual invalidation (i.e., clearing the physical TLB hit bits in the prevalidated cache tags) of a cache line may be completed immediately when the TLB entry is invalidated or later when a new TLB entry is assigned to the TLB slot location.

In an alternative design, the page size field can be deleted and all TLB entries may be forced to be the smallest page size available. In this alternative, the page size compares are removed. This alternative also requires that large page size TLB entries be broken into multiple TLB entries for the prevalidated cache TLB 520.

Figure 7:
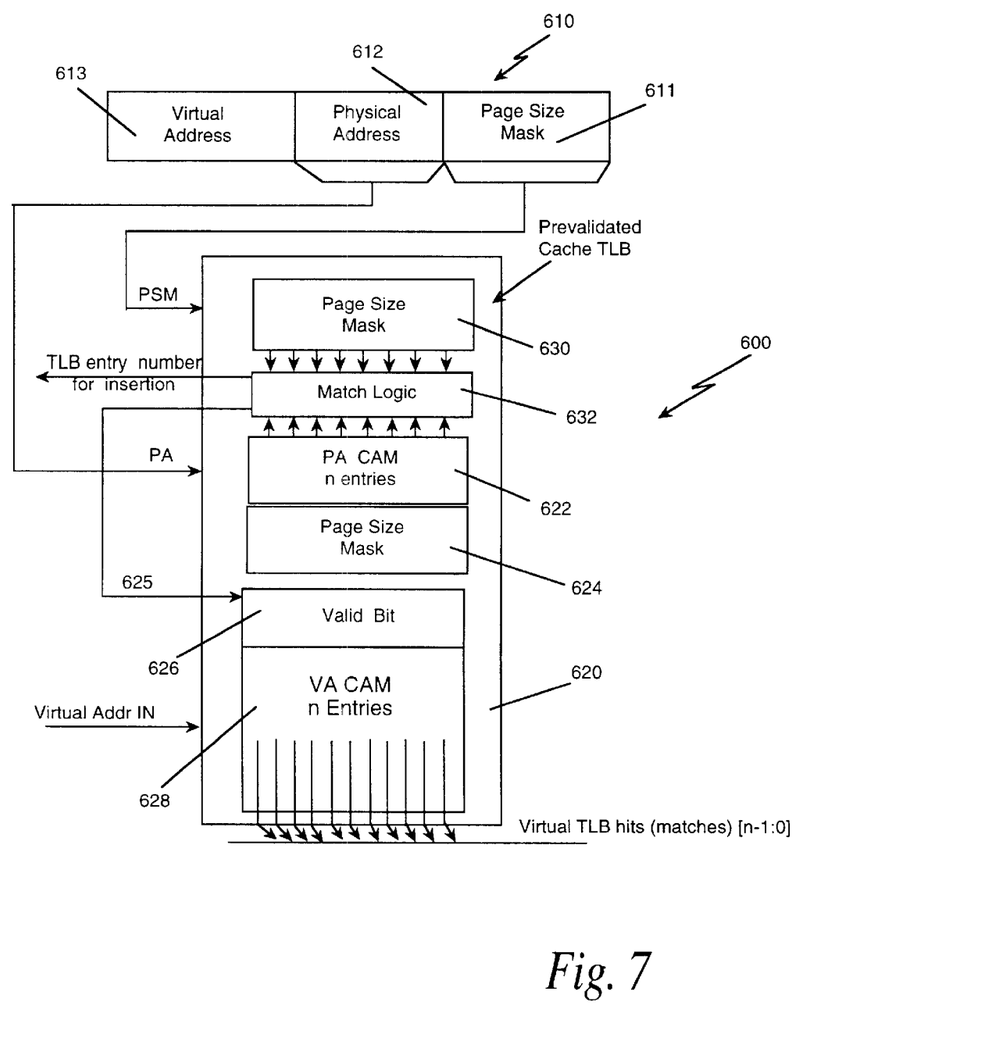
FIG. 7 illustrates a prevalidated cache TLB with address aliasing and replacing an existing TLB entry.

FIG. 7 shows an another example of an micro-architecture that supports address aliasing with saving of cache data when the page sizes are the same between new and current TLB entries. A micro-architecture 600 includes a PA CAM (not shown in FIG. 7) to save physical addresses in the TLB structure and page size information for each TLB entry. The micro-architecture 600 also includes a PA CAM to compare the physical address of a TLB entry to be inserted into the TLB with the physical addresses of all existing TLB entries masked appropriately with page size information. Upon detection of an existing TLB entry that overlaps the physical address space of a new TLB entry, the micro-architecture 600 replaces the current TLB entry with the new TLB entry, retaining the same TLB slot number. The cache line tags are prevalidated to the TLB slot number, so the cache lines are automatically linked to the new TLB entry. The micro-architecture 600 prevents the TLB from maintaining two TLB entries that point to the same physical address space.

As shown in FIG. 7, the micro-architecture 600 includes a prevalidated cache TLB 620. The TLB 620 includes a page size mask 630, match logic 632, a PA CAM 622, a page size mask 624, a VA CAM 628 and a valid bit module 626. A new TLB entry 610 for insertion is shown with page size mask data 611, a physical address 612 and a virtual address 613. The page size mask data 611 is provided to the page size mask 630 and the physical address 612 is provided to the PA CAM 622. The page size mask 630 checks the page size mask data 611 against all existing page size masks. The PA CAM 622 compares the incoming physical address 612 with each TLB entry's physical address masked with the page size mask data in the page size mask 624. If the physical address matches and the page size mask data are the same, the matching TLB entry number is saved for inserting the new TLB 620. The virtual address is provided to the VA CAM 628, and the VA CAM 628 compare results are ANDed with the valid bits to generate outputs as virtual TLB hits.

If the PA CAM 622 compares indicate a match but the page size mask compares indicate a different page size, then the existing TLB entry will be invalidated by clearing the associated TLB valid bit in the valid bit module 626, through signal 625.

Figure 8:
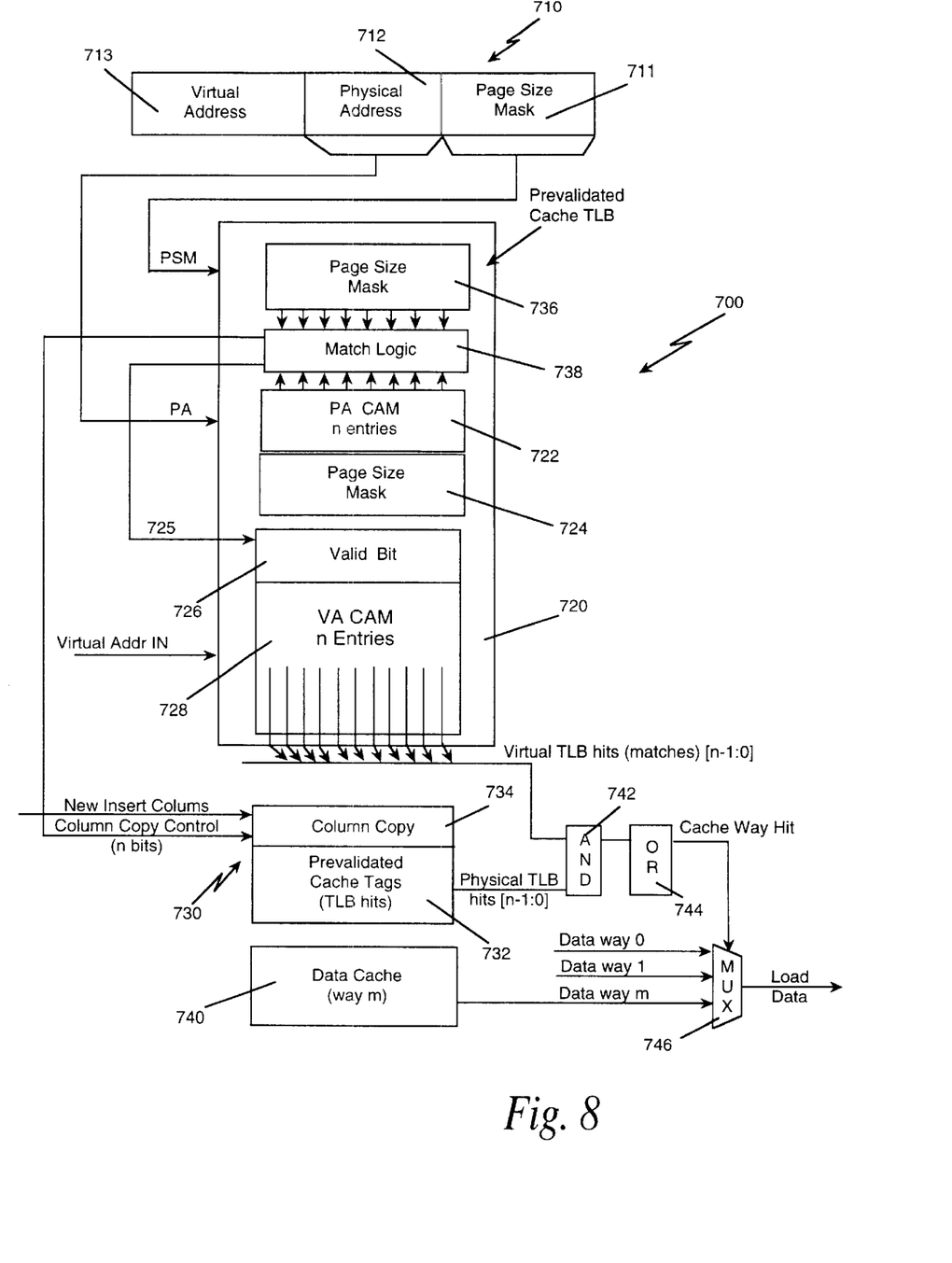
FIG. 8 illustrates a prevalidated cache design with address aliasing incorporating a column copy tag function that supports address aliasing when page sizes are the same.

Address aliasing can also be supported with current TLB entries retained as valid and a new TLB entry allocated to a different slot number. In this example, a RAM is provided to save physical addresses in the TLB 620 structure and the page size information for each entry. A CAM is provided to compare the physical address of the new TLB entry to be inserted into the TLB 620 with the physical addresses of all existing TLB entries masked appropriately with the page size information. Upon detection of an existing TLB entry that overlaps the physical address space of the new TLB entry, the cache lines from the current TLB entry are linked to the new TLB entry. A new tag function of column copy is used to copy the valid bits from current TLB entry slot number to the new TLB entry slot number in the prevalidated tag 734, as shown in FIG. 8. Because a cache line may have multiple physical TLB hits in a system, more than one physical TLB hit flag may be enabled when a cache line is loaded, based on a physical address compare with current entries in the TLB 620. This example allows the TLB 620 to maintain multiple TLB entries that point to the same physical address space.

FIG. 8 shows an example of address aliasing with a column copy tag function. An architecture 700 includes a prevalidated cache TLB 720, a prevalidated cache tag 730, and a data cache 740. A new TLB entry 710 for insertion is shown with page size mask data 711, a physical address 712 and a virtual address 713.

The prevalidated cache TLB 720 includes a page size mask 736, match logic 738, PA CAM 722, page size mask 724, valid bit module 726 and a VA CAM 728. The page size mask data 711 from the new TLB entry 710 is checked against all existing page size masks in the page size mask 736. An equal compare result is output to the match logic 738. The PA CAM 722 compares the new TLB physical address 712, masked with the page size mask data 711 with each TLB entry's physical address, masked with the stored page size mask data in the pages size mask 724. If the physical address matches and the page size mask are the same, the matching entry numbers are sent to a column copy function module 734 using the match logic 738. The column copy function module 734 is shown as an element of the prevalidated cache tag 730. The column copy function module 734 will copy the hit bits from one or more existing columns into a new column location. The column copy function module 734 performs an OR function when multiple columns are copied. A column number is equal to a TLB entry slot number.

If the PA CAM 722 compares indicate a match, but the page size mask compares indicate a different page size, then the existing TLB entry will be invalidated by clearing the associated TLB valid bit 726 through signal 725.

The VA CAM 728 receives virtual address data (n entries) from the TLB entry 710 and outputs virtual TLB hits that are ANDed with the physical TLB hits from the prevalidated cache 732 using AND circuit 742. The n outputs are then ORed in OR circuit 744 to produce a final cache way hit. Finally, the output of the data cache 740 is multiplexed as directed by the cache way hit using multiplexer 746 to provide load data.

Address aliasing can also be supported in a prevalidated cache architecture by saving cache data only when a new TLB entry has page sizes greater than or equal to a matching current TLB entry. In this example, page sizes are compared for different TLB entries and cache lines are assigned from one TLB entry to another. The architecture includes memory to save physical addresses in the TLB structure and page size information for each entry. A compare is provided to compare a new TLB entry to be inserted into the TLB with the physical addresses of all existing TLB entries, masked appropriately with page sizes information. A further compare is used to compare the page size of the new TLB entry with page sizes of all existing TLB entries to determine if the new TLB entry's page size is greater than or equal to that of the existing TLB entries. Upon detection of a TLB entry that overlaps a physical address space of the new TLB entry, and if the page size of the matching current TLB entry is smaller or equal in size to the page size of the new TLB entry, the current TLB entry is retained as valid and the new TLB entry is allocated to a different TLB slot number. To link the cache lines from the current TLB entry to the new TLB entry, a new tag function of column copy is used to copy the valid bits from one TLB entry slot number to the new TLB entry slot number. Due to the ability for a cache line to have multiple physical TLB hits in the system, more than one physical TLB hit may be enabled when a cache line is loaded, based on a physical address compare with the current entries in the TLB. Upon detection of an existing TLB entry that overlaps a physical address space of the new TLB entry, but with matching current entry page size larger than the page size of the new TLB entry, the current (larger) TLB entry is invalidated. Since the cache line is prevalidated to a TLB entry slot number, the cache lines related to the TLB entry are also invalidated.

Figure 9A:
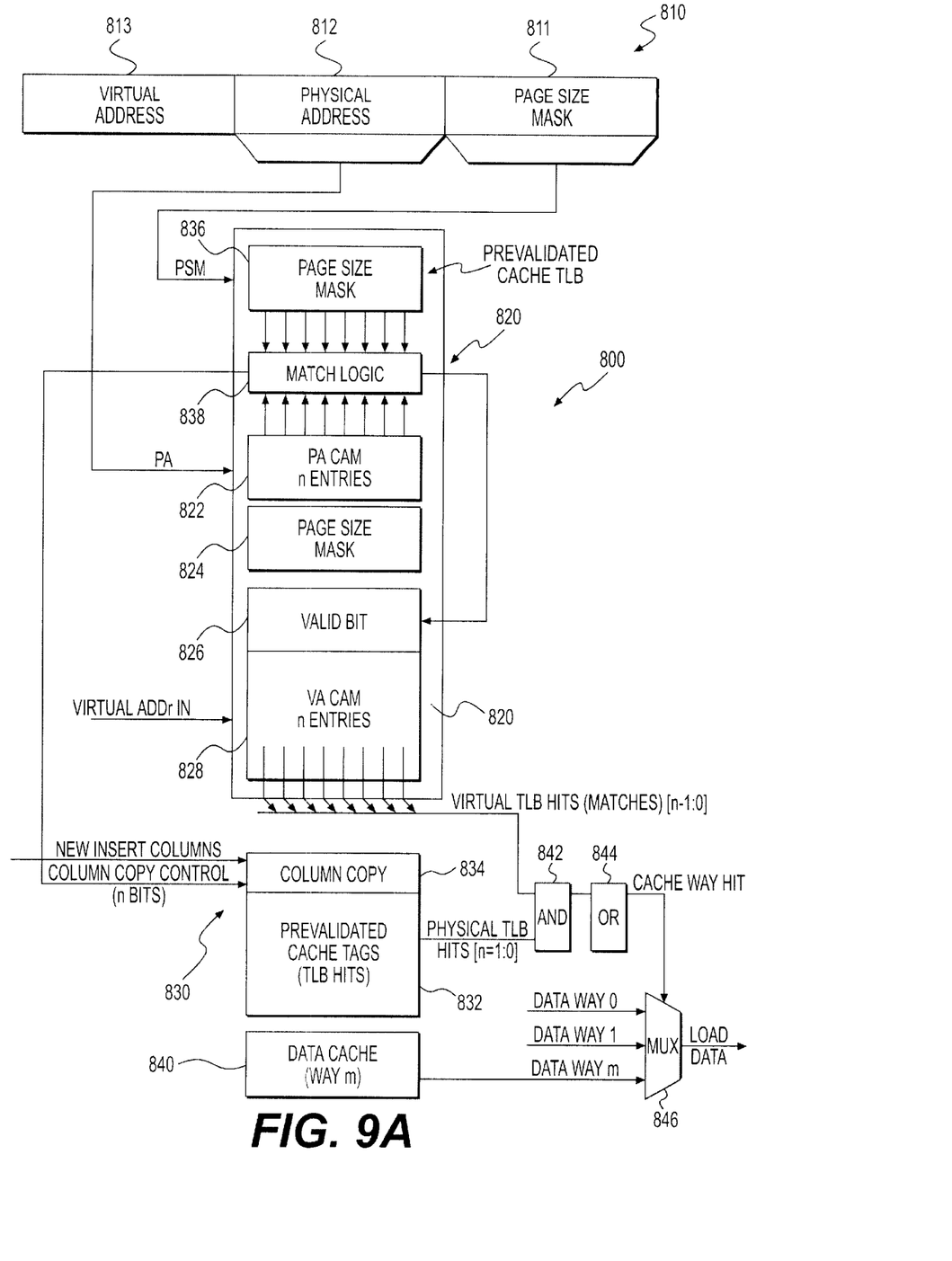
FIG. 9A illustrates a prevalidated cache design with address aliasing incorporating a column copy tag function which supports different page sizes.

FIG. 9A shows a micro-architecture 800 that supports address aliasing including column copy tag function when a page size of a new TLB entry is the same size or larger than a page size of an existing TLB entry. The architecture 800 includes a prevalidated cache TLB 820, a prevalidated cache tag 830, data cache 840, multiplexer 846, AND circuit 842 and OR circuit 844. A new TLB entry 810 for insertion in the TLB 820 includes page size mask data 811, a physical address 812, and a virtual address 813. The page size mask data 811 is provided to a page size mask module 836 and the physical address 812 and the page size mask data 811 are provided to a PA CAM 822 and a page size mask 824, respectively. In the page size mask module 836, the new page size mask data 811 is checked against all existing page size masks. An equal or greater compare result is output to a match logic 838. The PA CAM 822 compares the incoming physical address 812, masked with the page size mask data 811, with each existing TLB entry's physical address. If the physical address 812 matches a physical address of an existing TLB entry, and the new page size mask data 811 is greater than or equal to a page size mask corresponding to the matched TLB entry, then the match logic 838 outputs a column copy enable signal. Otherwise, the match logic 838 output an invalidate signal to the valid bit module 826.

If the current page size mask is larger than the new page size mask and the physical addresses match, then the existing (older) entry is invalidated by a signal from the match logic 838 to the valid bit module 826.

A column copy function module 834 in the prevalidated cache tag 830 copies one or more existing columns of hit bits into a new column location. An OR function is performed when multiple columns are copied. A column number is equal to a TLB entry slot number.

The VA CAM 828 outputs virtual TLB hits that are ANDed together with physical TLB hits from the prevalidated cache tags in the AND circuit 842. The output of the AND circuit 842 is ORed in the OR circuit 844 to produce an output cache way hit. The output cache way hit bits control the multiplexer 846, and select the data output from the data cache 840 to produce a load data signal.

Figure 9B:
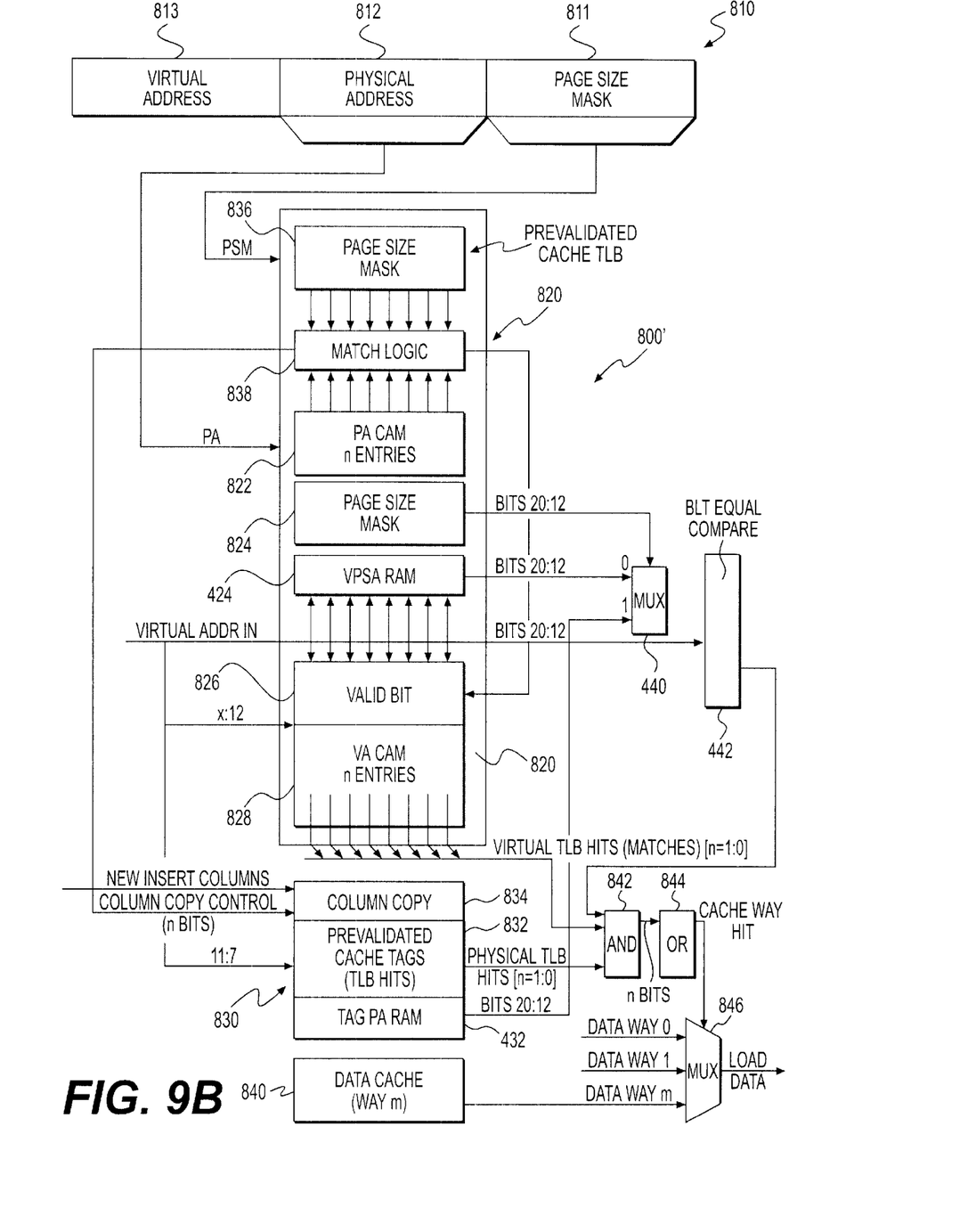
FIG. 9B illustrates a prevalidated cache design with address aliasing incorporating a column copy tag function that supports different and multiple page sizes.

FIG. 9B shows a micro-architecture 800' that includes the structure and functions of the micro-architecture 800 of FIG. 9A and the micro-architecture 400 of FIG. 5.

Figure 10:
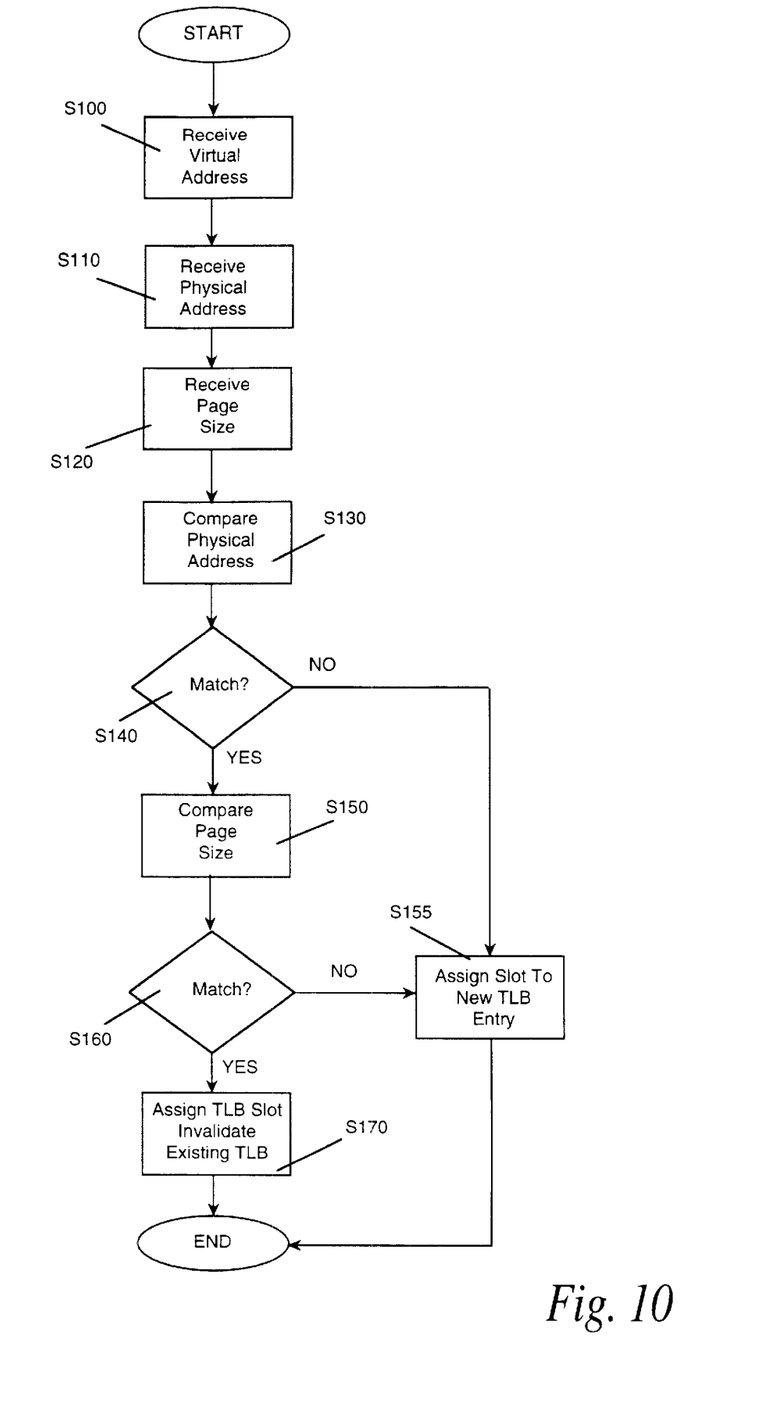
FIG. 10 is a block diagram of fimctions carried out by an embodiment of the micro-architecture of FIG. 7.

FIG. 10 is a block diagram showing some of the functional steps executed by the micro-architecture 600 shown in FIG. 7. In step S100, the VA CAM 628 receives virtual address information for a new TLB entry. The VA CAM 628 compares the received virtual address information with virtual address information for existing entries to determine virtual TLB hits. In step S110, the PA CAM 622 receives physical address information for the new TLB entry and in step S120, the page size mask 630 receives page size information for the new TLB entry. In step S130, the PA CAM 622 compares physical addresses of the new TLB entry with physical addresses of existing TLB entries. In step S140, the PA CAM 622 determines if the physical addresses match. If the physical addresses do not match, in step S155, match logic 632 assigns a new TLB slot number to the new TLB entry. Otherwise, if the physical addresses match, in step S150, the page sizes of the new TLB entry and the existing TLB entry are checked. In step S160, if the page sizes match, the page size mask 630 provides an output and in step S170, the match logic 632 assigns the new TLB entry a TLB slot number of the existing TLB entry and the existing TLB entry is invalidated. If the page sizes do not match, a new TLB entry is assigned a new TLB slot number. The process then ends.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

In the claims:

1. An apparatus to support address aliasing in a computer architecture having a prevalidated tag cache, comprising:

a translation lookaside buffer (TLB), comprising:

a virtual address content addressable memory (CAM) that receives virtual address information for a new TLB entry;

a physical address CAM that receives physical address information for the new TLB entry; and a valid bit module that provides valid bits, wherein the TLB holds physical address information for current TLB entries in one or more TLB slots, wherein the physical address CAM compares the physical address information of the new TLB entry with the physical address information of each of the current TLB entries and provides an output signal, wherein the output signal is input to the valid bit module, and wherein when the compare yields a match between the physical address information of the new TLB entry and the physical address information of one or more of the current TLB entries, the output signal will cause a valid bit associated with a matching current TLB entry to clear making the matching current TLB entry invalid.

2. The apparatus of claim 1, wherein virtual address CAM results are ANDed with the valid bits to provide TLB hit outputs and further comprising a first page size mask module coupled to the physical address CAM that receives a page size for the new TLB entry.

3. The apparatus of claim 2, wherein the TLB further comprises:

a second page size mask module that receives the page size for the new TLB entry and compares the page size of the new TLB entry with page sizes of existing TLB entries; and a match logic module operably connecting the second page size mask module and the physical address CAM, wherein the match logic module receives the page size comparison and physical address comparison, and wherein when the pages sizes and the physical addresses match, the new TLB entry is assigned to the TLB slot of a matched current TLB entry, and wherein if the physical addresses match but the page sizes are different, the valid bit is cleared for the existing TLB entry.

4. The apparatus of claim 2, wherein the TLB further comprises:

a prevalidated cache tag having one or more indexes;

a second page size mask module that receives the page size for the new TLB entry and compares the page size of the new TLB entry with page sizes of existing TLB entries; and a match logic module operably connecting the second page size mask module and the physical address CAM, and further comprising:

a column copy module, wherein valid bits in the prevalidated cache tag are copied from one TLB slot to another TLB slot;

wherein the match logic module receives the page size comparison and physical address comparison, wherein when the pages sizes and the physical addresses match, the new TLB entry is assigned to a new TLB slot different from a current TLB slot of a matched current TLB entry and the column copy module copies valid bits from the current TLB slot to the new TLB slot for each index in the prevalidated cache tag, and wherein if the physical address matches but the page sizes are different, the valid bit is cleared for the existing TLB entry.

5. The apparatus of claim 2, wherein the TLB further comprises:

a prevalidated cache tag having one or more indexes;

a second page size mask module that receives the page size for the new TLB entry and compares the page size of the new TLB entry with page sizes of existing TLB entries; and a match logic module operably connecting the second page size mask module and the physical address CAM, and further comprising:
  a column copy module, wherein valid bits in the prevalidated cache tag are copied from one TLB slot to another TLB slot;

wherein the match logic module receives the page size comparison and physical address comparison, and wherein when physical addresses match, and a page size of the new TLB entry is greater than or equal to a page size of a current TLB entry, the new TLB entry is assigned to a new TLB slot different from a current TLB slot of a matched current TLB entry and the column copy module copies valid bits from the current TLB slot to the new TLB slot for each index in the prevalidated cache tag.

6. The apparatus of claim 5, wherein when the page size of the new TLB entry is less than the page size of the current TLB entry, the match logic module signals the valid bit module to invalidate the current TLB entry.

7. The apparatus of claim 1, wherein the TLB includes logic to support multiple page sizes, the logic comprising:

a page size mask random access memory (RAM) that holds a page size mask and provides a first output signal;

a virtual page size address RAM that holds a virtual address for a page size region of all existing TLB entries and provides a second output signal; and a multiplexer, and wherein the apparatus further comprises:
  a tag physical address RAM that holds physical address bits corresponding to a range of page sizes and provides a third output signal, wherein the multiplexer receives the first, second and third output signals and provides a partial TLB hit signal.

8. The apparatus of claim 7, further comprising:

a prevalidated cache tag array that provides TLB hits;

a page region comparator that receives the partial TLB hit signal and virtual address information, performs a page size comparison and provides page size hits; and a hit generation logic circuit that receives TLB hits from the virtual address CAM, hits from the prevalidated cache tag array, and hits from the page size comparator, wherein when the page size comparison indicates a match, the comparator provides an output signal to the hit generation logic circuit, the hit generation logic circuit providing a cache way hit.

9. A method for supporting address aliasing in a computer architecture having a prevalidated cache tag, and a translation lookaside buffer (TLB), comprising:

receiving a virtual address for a new TLB entry in a virtual address content addressable memory (CAM);

receiving a physical address for the new TLB entry in a physical address CAM;

comparing the physical address of the new TLB entry with physical addresses of existing TLB entries;

providing an output signal indicative of the comparison; and when the physical address comparison indicates a match, invalidating a current TLB entry that matches the new TLB entry.

10. The method of claim 9, further comprising receiving a page size for the new TLB entry in a page size mask.

11. The method of claim 10, further comprising:

comparing the page size for the new TLB entry with page sizes of the existing TLB entries;

when the physical address and the page size of the new TLB entry matches a physical address and a page size of an existing TLB entry, assigning the new TLB entry to a TLB slot of the matched existing TLB entry; and invalidating the matched existing TLB entry.

12. The method of claim 10 with an existing TLB entry having a first TLB slot, further comprising:

comparing the page size of the new TLB entry with page sizes of existing TLB entries;

when the page size comparison indicates a match, assigning a new TLB entry to a second TLB slot different from the first TLB slot; and copying valid bits from the first TLB slot to the second TLB slot.

13. The method of claim 10 with an existing TLB entry having a first TLB slot, further comprising:

comparing the page size of the new TLB entry with page sizes of existing TLB entries;

when the physical addresses match and when the page size of the new TLB entry is greater than or equal to a page size, assigning the new TLB entry to a second TLB slot; and copying valid bits from the first TLB slot to the second TLB slot.

14. The method of claim 10, further comprising:

comparing the page size of the new TLB entry with page sizes of existing TLB entries; and when the physical addresses match and when the page size of the new TLB entry is less than a page size of the existing TLB entry, invalidating the existing TLB entry.

15. The method of claim 10, further comprising:

holding a page size mask in a memory and providing a first output signal indicative of the page size;

holding a virtual address for existing TLB entries and providing a second output signal;

holding a physical address corresponding to a range of page sizes and providing a third output signal; and multiplexing the second and third output signals by the control on the first output signal to provide a partial TLB hit signal.

16. The method of claim 15 in a prevalidated cache tag array, further comprising:

providing TLB hits;

comparing page size information based on virtual address information and the partial TLB hit signal;

receiving the TLB hits and page size hits; and when the page size comparison indicates a match, providing an output signal to a hit generation logic, the hit generation logic providing a cache way hit.

17. A computer architecture that supports multiple page sizes and addressing aliasing, comprising:

a translation lookaside buffer (TLB) that receives a virtual address and a physical address for a new TLB entry and a page size for the new TLB entry, wherein the physical address and the page size of the new TLB entry are compared to physical addresses and page sizes of existing TLB entries, and a TLB output signal is generated; and a prevalidated tag cache having a column copy module that copies valid bits from a matched existing entry slot to a new TLB slot, and wherein the new TLB entry is assigned to the new TLB slot.

* * * * *